United States Patent
Loesel

(10) Patent No.: US 7,643,521 B2
(45) Date of Patent: Jan. 5, 2010

(54) MATERIAL PROCESSING SYSTEM WITH VARIABLE REPETITION RATE LASER

(75) Inventor: Frieder Loesel, Mannheim (DE)

(73) Assignee: Technolas Perfect Vision GmbH, Munich (DE)

(*) Notice: Subject to any disclaimer, the term of this patent is extended or adjusted under 35 U.S.C. 154(b) by 151 days.

(21) Appl. No.: 11/460,567

(22) Filed: Jul. 27, 2006

(65) Prior Publication Data

US 2008/0025351 A1    Jan. 31, 2008

(51) Int. Cl.
*H01S 3/10* (2006.01)
*B23K 26/00* (2006.01)

(52) U.S. Cl. ........................... 372/25; 219/121.6

(58) Field of Classification Search ................ 372/25, 372/18, 26; 219/121.6
See application file for complete search history.

(56) References Cited

U.S. PATENT DOCUMENTS

| | | | |
|---|---|---|---|
| 4,665,524 A | 5/1987 | Cotter | |
| 4,727,381 A | 2/1988 | Bille et al. | |
| 4,798,204 A | 1/1989 | L'Esparance, Jr. | |
| 4,887,592 A | 12/1989 | Loertscher | |
| 4,907,586 A | 3/1990 | Bille et al. | |
| 4,973,330 A | 11/1990 | Azema et al. | |
| 4,988,348 A | 1/1991 | Bille | |
| 6,331,177 B1 | 12/2001 | Munnerlyn et al. | |
| 2003/0229339 A1* | 12/2003 | Bille | 606/5 |
| 2004/0196354 A1* | 10/2004 | Hansen et al. | 347/224 |
| 2005/0271095 A1* | 12/2005 | Smart | 372/26 |

* cited by examiner

*Primary Examiner*—Minsun Harvey
*Assistant Examiner*—Patrick Stafford
(74) *Attorney, Agent, or Firm*—Nydegger & Associates

(57) ABSTRACT

A system for using a pulsed laser beam to process materials includes a selector for varying the pulse repetition rate of the laser beam. Also included is a control unit for identifying an optimal pulse repetition rate that is compatible with the required pulse energy level for processing the material. Variations in the pulse repetition rate can be made during a procedure pursuant to either pre-programmed instructions, or in response to closed loop feedback controls.

15 Claims, 1 Drawing Sheet

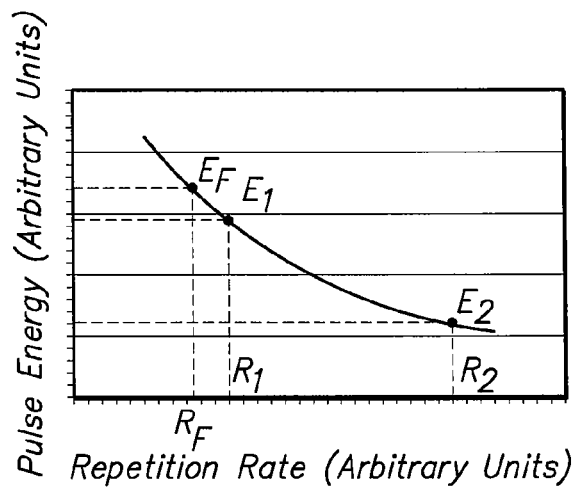
FIG. 1
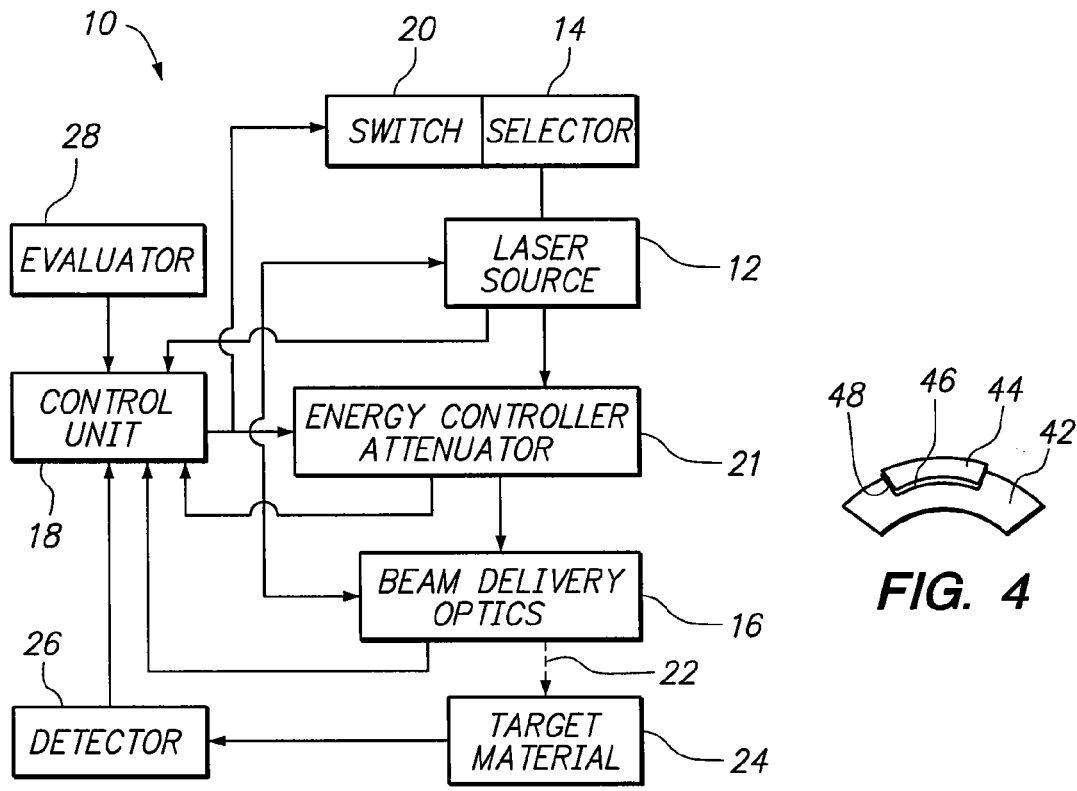
FIG. 2
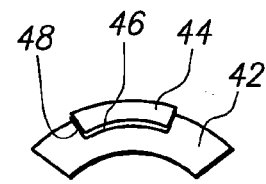
FIG. 4
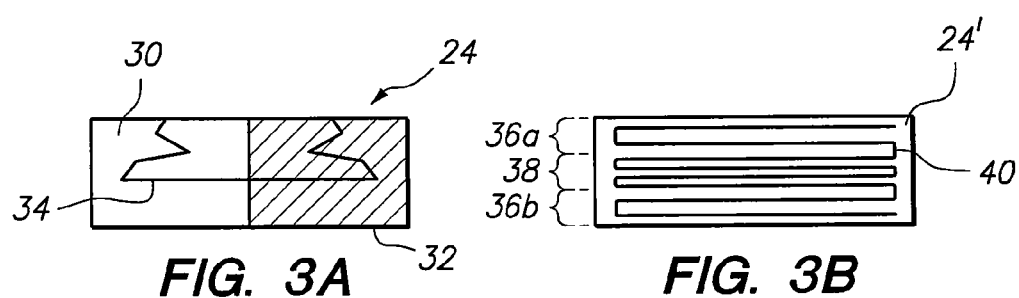
FIG. 3A
FIG. 3B

MATERIAL PROCESSING SYSTEM WITH VARIABLE REPETITION RATE LASER

FIELD OF THE INVENTION

The present invention pertains generally to laser systems that are used to alter and process materials. More particularly, the present invention pertains to pulsed laser systems that are used for processing materials with procedure sections that require different energy levels for laser-material interaction (i.e. ablation). The present invention is particularly, but not exclusively, useful for employing the effective required energy level while optimizing the pulse repetition rate of a laser system during a material processing procedure.

BACKGROUND OF THE INVENTION

Any material, regardless whether it is homogeneous or composite, can be processed in any number of different ways. And, depending on the desired results, the procedure that is selected for processing the material can be performed using operational parameters that may need to be changed during the procedure. Of particular interest here are laser systems that process or alter material for purposes of cutting, reshaping or removing portions of the material(s). As is well known, laser processes for doing this typically involve phenomena such as laser induced optical breakdown (LIOB), photodecomposition, or photoablation.

In recent years (i.e. since the invention of the laser in the 1960s) laser systems have been effectively used to alter or process a significant number of different type materials. More recently, it has been recognized that laser beams which have laser pulses of ultra short duration (e.g. picosecond and femtosecond duration) are particularly effective for many applications. Normally, such laser systems are operated at a fixed level of pulse energy, with a fixed pulse repetition rate. Thus, it has been a standard practice to determine the energy level that is required in laser pulses to effectively process a target material(s). A pulse repetition rate that will maintain this energy level is then accepted. If lower energies would be needed of sections of a processing procedure, the output energy of the laser would be simply reduced using well known types of attenuators while maintaining the same pulse repetition rate. This, however, does not consider the fact that changes in a pulse repetition will result in changes in the energy level of the laser pulses in the beam. It happens for many applications that this fact may be advantageously used.

Referring to FIG. 1, the relation of pulse energy and repetition rate in a typical ultra short pulse laser beam is shown. Specifically, FIG. 1 shows that as the repetition rate (R) of pulses in a laser beam is increased, the energy level (E) of the pulses decreases. Stated differently, the energy level in each pulse is dependent on the pulse repetition rate, and they vary inversely. As indicated above, this trend may be used to advantage because many, in fact most, materials are not homogeneous. Thus, such materials (e.g. composites) will have different energy thresholds for ablation, and therefore require different energy levels to alter or process different sections of the material. Furthermore, even in homogeneous materials, different sections within a processing procedure may require different energy levels.

In light of the above, it is an object of the present invention to provide a system and a method for predetermining the energy level required to alter or process a section of material, and then using the corresponding maximum pulse repetition rate with a view toward reducing the time required to perform a material processing procedure. Another object of the present invention is to provide a system and method for processing a material that effectively employs a variable pulse repetition rate to minimize the time required to perform a material processing procedure. Still another object of the present invention is to provide a system and a method for processing a material that selectively varies the pulse repetition rate of a laser beam, either pursuant to pre-programmed instructions or in response to closed loop feedback controls. Yet another object of the present invention is to provide a system and a method for processing a material that is relatively simple to manufacture, is easy to use, and is comparatively cost effective.

SUMMARY OF THE INVENTION

In accordance with the present invention, a system for processing materials includes a laser source for generating a laser beam. Specifically, the beam includes a sequence of laser pulses that each have a predetermined energy level. Further, the duration of each pulse in the laser beam is ultra short, and is preferably in the range of picoseconds or femtoseconds. With this in mind, it is an important aspect of the present invention that the laser source be operated to vary the repetition rate of laser pulses in the beam.

In addition to the laser source, the system of the present invention also includes optics for directing the laser beam to a target area (e.g. focal spot) and to then move the interaction point along a path through the material that is to be processed. As implied above, the system also includes an evaluator that determines a required (i.e. predetermined) energy level for each laser pulse at particular focal spots. Specifically, the value of this required energy level is whatever is necessary to process the material at the focal spot (e.g. target area).

A control unit is also provided for identifying a required pulse repetition rate, based on the predetermined required energy level mentioned above. Further, a selector is provided for varying the required pulse repetition rate, as necessary, in order to establish and maintain the required energy level in the laser pulses. As envisioned for the present invention, variations in the pulse repetition rate of the laser beam can be automatically made by the selector during a procedure. For this purpose, the selector can respond to either pre-programmed instructions, or to closed loop feedback controls.

As an example of a procedure that can be usefully performed by the system of the present invention, consider a substantially transparent material that may have different energy level processing requirements (e.g. different energy thresholds) within the material. In such a case it may well be advantageous to vary the pulse repetition rate with a view toward minimizing the time required to perform the procedure. For instance, this can be done by using a first required pulse repetition rate ($R_1$) on a processing section having a relatively high energy processing requirement ($P_1$), and using a second required pulse repetition rate ($R_2$) on a processing section having a relatively low energy processing requirement ($P_2$). In the procedure, $R_1$ is not equal to $R_2$, instead $R_2$ will be faster (e.g. $R_1 < R_2$).

For the present invention, it is envisioned that the processing (i.e. ablation) of materials will involve altering the material during a laser-material interaction. As noted above, this interaction can be a laser induced optical breakdown (LIOB), photodecomposition, or photoablation. In any event, it is also envisioned that this laser-material interaction will induce an identifiable response from the material. For example, the identifiable response from LIOB may be a gas bubble, and the identifiable response from photoablation may be a plasma spark. For the embodiment of the present invention that relies on closed loop feedback control, the identifiable response from the laser-material interaction is monitored by a detector. A switch that is connected to the selector can then be operated in response to signals from the detector. Specifically, the switch/selector combination for this embodiment of the present invention will then change the pulse repetition rate of the laser beam, as appropriate. Effectively, all of this is done as a feedback control in response to changes in the identifiable response in the material.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 1 is a graph showing the relation between pulse energy and repetition rate in a typical ultra short pulse laser source;

FIG. 2 is a schematic of a system for processing a material in accordance with the present invention;

FIG. 3A is a representation of a beam path through a non-homogeneous (e.g. composite) material as envisioned for the present invention;

FIG. 3B is a representation of a beam path through a homogeneous material, wherein different sections of the material have different processing requirements; and FIG. 4 is a representative view of a cross section of an eye showing a procedure using the present invention.

DESCRIPTION OF THE PREFERRED EMBODIMENTS

Referring initially to FIG. 2, a system for processing a material in accordance with the present invention is schematically shown and is generally designated 10. As shown, the system 10 includes a laser source 12 and a selector 14. The laser source 12 is also connected to a beam delivery optics 16. These various components of the system 10 (i.e. laser source 12, selector 14 and beam delivery optics 16) are each also connected in two-way electronic communication with a control unit 18. Further, the system 10 also includes a switch 20 that is interconnected between the control unit 18 and the selector 14. As disclosed below, the switch 20 is optional and may be selectively used in the operation of the system 10, if desired. Additionally, the system 10 can include an energy/controller (attenuator) 21. Specifically, the energy/controller 21 can be installed for fine adjustments of the energy in pulses of pulsed laser beam 22 that are generated by the laser source 12. Preferably, the pulse energy/controller 21 is of a type disclosed in U.S. patent application Ser. No. 10/835,088 which is assigned to the same assignee as the present invention.

Still referring to FIG. 2, it is to be appreciated that the system 10 is intended to generate a pulsed laser beam 22, and to direct the laser beam 22 to a target material 24 (i.e. workpiece) for the purpose of processing the material 24. As envisioned for the present invention, the pulsed laser beam 22 will comprise a sequence of laser pulses, wherein each pulse has an ultra short duration (e.g. picoseconds or femtoseconds duration), and it will have a pulse repetition rate that can be varied. As also envisioned by the present invention, the pulsed laser beam 22 will interact with the target material 24 to cause a laser-material interaction (e.g. an ablation such as laser induced optical breakdown (LIOB), photo decomposition or photoablation). Further, a consequence of the laser-material interaction (i.e. ablation) will be the creation of an identifiable response from the target material 24. Typically, such a response is produced as the laser beam 22 processes or alters the target material 24. For example, in the case of LIOB, this identifiable response may be the size of a gas bubble. In the case of photoablation, the identifiable response may be a plasma spark. In all cases it is envisioned that the target material 24 will somehow be altered (e.g. cut, shaped, destroyed or removed) by the laser-material interaction. Depending on the type material being processed, and the nature of the desired change in the material, the laser-material interaction may either be superficial or intra-material.

FIG. 2 also shows that the system 10 includes a detector 26 that, if used, will monitor the identifiable response that results from a laser-material interaction. For this purpose, the detector 26 is electronically connected to the control unit 18 to relay information to the control unit 18 about the existence or change in an identifiable response. Also, an evaluator (user interface) 28 is provided to give input to the control unit 18. Specifically, as envisioned for the system 10, the evaluator 28 can be any means known in the pertinent art that will provide the control unit 18 with information about the laser pulse energy levels that are required for an effective laser-material interface with the target material 24.

Operation

In the operation of the system 10, the target material 24 is first evaluated to determine the laser pulse energy levels that are required to achieve an effective laser-material interface. For example, the target material 24 shown in FIG. 3A is considered to be a non-homogeneous or composite material that has a first section 30 and a second section 32. In this example, it is established by the evaluator 28 that the first section 30 has a relatively high energy threshold requirement for laser processing ($P_1$). It is also established that the second section 32 has a relatively low energy threshold requirement for laser processing ($P_2$). Further, the evaluator 28 also determines that the target material 24 requires processing along a path 34 (i.e. a cut pattern) that passes through both sections 30 and 32 of the target material 24. All of this information (i.e. energy requirements $P_1$ and $P_2$, as well as the location of path 34) is provided to the control unit 18 by the evaluator 28.

With the information supplied by the evaluator 28, the control unit 18 identifies pulse repetition rates for the laser beam 22 that are necessary to maintain the required energy levels for an effective laser-material interaction. The control unit 18 then uses this information to control the operation of system 10 as the laser beam 22 interacts with the target material 24. More specifically, the control unit 18 communicates directly with the laser source 12, the selector 14 and the beam delivery optics 16 to maintain a required pulse repetition rate for the laser beam 22. Preferably, the required pulse repetition rate will be the highest (i.e. fastest) rate that will allow the laser beam 22 to achieve the required energy levels in its individual pulses. In this example, consider that section 30 of the target material 24 has a relatively high energy requirement for processing ($P_1$), and that section 32 has a relatively low energy requirement for processing ($P_2$). The system 10 can then use a lower pulse repetition rate ($R_1$) for the higher required energy along path 34 in section 30, and a higher pulse repetition rate ($R_2$) for the lower required energy along the path 34 in section 32.

In another example of the operation of the system 10, the target material 24' shown in FIG. 3B is considered to be substantially homogeneous. It can happen, however, that to effectively process the target material 24', it is necessary to treat it as having different procedure sections. In this example, consider that the upper procedure section 36a and the lower procedure section 36b of the target material 24' both have a higher energy requirement for processing than does the intermediate procedure section 38. Nevertheless, it is desirable to process the target material 24' by moving the interaction point of the pulse laser beam 22 along a continuous path 40, without any interruption. Consequently, in order to properly process the target material 24' along the path 40, it is necessary to somehow vary the energy of pulses in the pulsed laser beam 22. In accordance with the present invention this can be done simply by varying the pulse repetition rate (R) of the laser beam 22. Specifically, for the relatively higher energy requirement ($E_1$) that is needed to process the target material 24' in the procedure sections 36a and 36b, a relatively lower pulse repetition rate ($R_1$) is used. On the other hand, for the relatively lower energy requirement ($E_2$) needed to process the intermediate procedure section 38, a higher pulse repetition rate ($R_2$) can be used.

In one mode of operation, the control unit 18 of system 10 can be pre-programmed with the information that is provided by the evaluator 28. The laser source 12 can then be merely turned on, and the procedure is performed. To do this, the control unit 18 wilt manipulate the beam delivery optics 16 and maintain appropriate pulse repetition rates via the selector 14 to accomplish the desired laser-material interaction in the target material 24. All of this is done in accordance with the pre-programmed procedure, and done regardless of the type material (24 or 24') being processed.

In another mode of operation, the detector 26 is used to monitor the target material 24 for feedback control purposes. In this mode, after the laser source 12 has been activated, the detector 26 will determine whether there is a laser-material interaction and, if so, does it change. The signals that are then generated by detector 26 in response to laser-material interaction information are fed back to the control unit 18. Control unit 18 will then use these signals to appropriately control the operation of the laser source 12, selector 14 and beam delivery optics 16.

As discussed above with reference to FIG. 3B, it is to be appreciated that the system 10 of the present invention can be used for substantially homogeneous materials, i.e. materials that have a substantially constant energy threshold for a laser-material interface. Specifically, the cornea 42 of an eye is such a material. In FIG. 4 a cornea 42 is shown with a flap 44 cut therefrom. In this case, the flap 44 is cut from a flap bed 46 in the cornea 42 and from a flap rim 48. Here, although the energy threshold is substantially constant throughout the cornea 42, it can be desirable to use higher energy pulses when cutting the flap rim 48. If so, in accordance with the present invention, the flap bed 46 can be cut using a higher pulse repetition rate than is used on the flap rim 48. The beneficial consequence here is that the entire procedure can be accomplished in a shorter period of time.

While the particular Material Processing System with Variable Repetition Rate Laser as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for processing materials which comprises:
a laser source for generating a beam of laser pulses having a required first pulse repetition rate ($R_1$) with a first predetermined energy level in each laser pulse to process a first material at a first target area, and for alternately generating a required second pulse repetition rate ($R_2$) with a second predetermined energy level in each laser pulse to process a second material at a second target area, wherein the first material is contiguous with and different from the second material;
an optical means for directing the laser beam to the respective target areas in the material to alter the respective material therein with an interaction to induce a characteristically identifiable response from the respective material;
a detector for monitoring the identifiable response in the respective material; and
a switch for changing between the first required pulse repetition rate $R_1$ and the second required pulse repetition rate $R_2$ in response to changes in the identifiable response in the material.

2. A system as recited in claim 1 wherein an interaction is a laser induced optical breakdown (LIOB), wherein the material is a substantially transparent material, and wherein the first required pulse repetition rate ($R_1$) is maintained by the selector for use on a procedure section having a relatively high energy processing requirement ($P_1$), and the second required pulse repetition rate ($R_2$) is maintained by the selector for use on a procedure section having a relatively low energy processing requirement ($P_2$), and wherein $R_1$ is less than $R_2$ ($R_1 < R_2$).

3. A system as recited in claim 1 wherein the identifiable response is a gas bubble and the switch changes between $R_1$ and $R_2$ in response to a predetermined change in the diameter of the gas bubble.

4. A system as recited in claim 1 wherein an interaction is selected from a group consisting of laser induced optical breakdown (LIOB), photodecomposition, and photoablation.

5. A system as recited in claim 4 wherein the identifiable response from photoablation is a plasma spark.

6. A system as recited in claim 1 wherein establishment of the required pulse repetition rate is accomplished by a selector in accordance with a pre-programmed procedure.

7. A system as recited in claim 1 wherein establishment of the required pulse repetition rate is accomplished by a selector in response to closed loop feedback control.

8. A system as recited in claim 1 wherein an optical means directs the laser beam along a path through the material.

9. A system as recited in claim 1 wherein each laser pulse has a duration in a range including femtoseconds and picoseconds.

10. A system for processing materials with a required energy level which comprises:
a laser source for generating a beam of laser pulses having a pulse repetition rate variable between a required first pulse repetition rate ($R_1$) with a first predetermined energy level in each laser pulse to process a first material at a first target area, and for alternately generating a required second pulse repetition rate ($R_2$) with a second predetermined energy level in each laser pulse to process a second material at a second target area, wherein the first material is contiguous with and different from the second material;
an optical means for directing the laser beam to a target area in the respective material to alter the material therein with an interaction to induce a characteristically identifiable response from the respective material;
a means for identifying a required pulse repetition rate to achieve the required energy level at the target area;

a means for establishing the required pulse repetition rate to maintain the required energy level in the laser pulses for processing the material;

a monitoring means for detecting the identifiable response in the respective material; and a means for changing between the first required pulse repetition rate $R_1$ and the second required pulse repetition rate $R_2$ in response to changes in the identifiable response in the material.

11. A system as recited in claim 10 wherein an identifying means is a control unit and an establishing means is a selector.

12. A system as recited in claim 10 wherein the material is a substantially transparent material, and wherein the first required pulse repetition rate ($R_1$) is maintained by a selector for use on a procedure section having a relatively high energy processing requirement ($P_1$), and the second required pulse repetition rate ($R_2$) is maintained by the selector for use on a procedure section having a relatively low energy processing requirement ($P_2$), and wherein $R_1$ is less than $R_2$ ($R_1 < R_2$).

13. A system as recited in claim 10 wherein the identifiable response is a gas bubble and a switch changes between $R_1$ and $R_2$ in response to a predetermined change in the diameter of the gas bubble.

14. A method for processing materials which comprises the steps of:

determining a required energy level for processing the material;

providing a laser source for generating a beam of laser pulses having a pulse repetition rate variable between a required first pulse repetition rate ($R_1$) with a first predetermined energy level in each laser pulse to process a first material at a first target area, and for alternately generating a required second pulse repetition rate ($R_2$) with a second predetermined energy level in each laser pulse to process a second material at a second target area, wherein the first material is contiguous with and different from the second material;

directing the laser beam to a target area in the respective material;

identifying a required pulse repetition rate to achieve the required energy level at the target area;

establishing the required pulse repetition rate to maintain the required energy level in the laser pulses for processing the material;

monitoring the identifiable response in the respective material resulting from the establishing step; and changing between the first required pulse repetition rate $R_1$ and the second required pulse repetition rate $R_2$ in response to changes in the identifiable response in the material.

15. A method recited in claim 14 further comprising the steps of:

maintaining the first required pulse repetition rats ($R_1$) for use on a procedure section having a relatively high energy processing requirement ($P_1$); and maintaining the second required pulse repetition rate ($R_2$) for use on a procedure section having a relatively low energy processing requirement ($P_2$), and wherein $R_1$ is less than $R_2$ ($R_1 < R_2$).

* * * * *

UNITED STATES PATENT AND TRADEMARK OFFICE
CERTIFICATE OF CORRECTION

PATENT NO. : 7,643,521 B2  Page 1 of 1
APPLICATION NO. : 11/460567
DATED : January 5, 2010
INVENTOR(S) : Frieder Loesel It is certified that error appears in the above-identified patent and that said Letters Patent is hereby corrected as shown below:

Column 5, Line 24
DELETE
"wilt"
INSERT
--will--

Column 8, Line 23
DELETE
"rats"
INSERT
--rate--

Signed and Sealed this

Fifteenth Day of June, 2010

David J. Kappos
*Director of the United States Patent and Trademark Office*